(12) United States Patent
Arngren et al.

(10) Patent No.: US 12,224,845 B2
(45) Date of Patent: Feb. 11, 2025

(54) METHOD AND ARRANGEMENTS FOR PROVIDING SATELLITE CONTROLLED DATA EXCHANGE

(71) Applicant: Telefonaktiebolaget LM Ericsson (PUBL), Stockholm (SE)

(72) Inventors: Tommy Arngren, Södra Sunderbyn (SE); Daniel Bergström, Luleå (SE)

(73) Assignee: Telefonaktiebolaget LM Ericsson publ), Stockholm (SE)

( * ) Notice: Subject to any disclaimer, the term of this patent is extended or adjusted under 35 U.S.C. 154(b) by 677 days.

(21) Appl. No.: 17/286,045

(22) PCT Filed: Oct. 22, 2018

(86) PCT No.: PCT/EP2018/078881
§ 371 (c)(1),
(2) Date: Apr. 16, 2021

(87) PCT Pub. No.: WO2020/083463
PCT Pub. Date: Apr. 30, 2020

(65) Prior Publication Data
US 2021/0359749 A1 Nov. 18, 2021

(51) Int. Cl.
*H04W 76/14* (2018.01)
*H04B 7/185* (2006.01)
(Continued)

(52) U.S. Cl.
CPC ....... *H04B 7/18504* (2013.01); *H04B 7/1851* (2013.01); *H04W 4/023* (2013.01);
(Continued)

(58) Field of Classification Search
CPC . H04B 7/18504; H04B 7/1851; H04W 76/14; H04W 4/80; H04W 4/40; H04W 4/023; H04W 64/006
See application file for complete search history.

(56) References Cited

U.S. PATENT DOCUMENTS 9,750,035 B2 * 8/2017 Lindoff ................. H04W 24/08
10,742,309 B2 * 8/2020 Reis ..................... H04W 16/28
(Continued)

FOREIGN PATENT DOCUMENTS

| EP | 3 120 597 B1 | 8/2018 |
| WO | 2016 012889 A1 | 1/2016 |

OTHER PUBLICATIONS

PCT International Search Report issued for International application No. PCT/EP2018/078881—Jul. 11, 2019.
(Continued)

*Primary Examiner* — Khawar Iqbal
(74) *Attorney, Agent, or Firm* — Sage Patent Group

(57) ABSTRACT

A method is executable by a first communication device, where the method comprise listening to satellite transmissions, which is transmitting conditions for allowing the first communication device to exchange data with a second communication device, recognizing conditions for allowing exchange of data between the first and the second communication devices, determining requirements for data exchange under the mentioned conditions, and determining according to the conditions, a time interval within which the second communication device is expected to be located within device-to-device, D2D, communication range of the first communication device, after which data is exchanged between the first and the second communication device, within the determined time interval.

14 Claims, 9 Drawing Sheets

(51) Int. Cl.
   *H04W 4/02* (2018.01)
   *H04W 4/40* (2018.01)
   *H04W 4/80* (2018.01)
   *H04W 64/00* (2009.01)

(52) U.S. Cl.
   CPC ............... *H04W 4/40* (2018.02); *H04W 4/80* (2018.02); *H04W 64/006* (2013.01); *H04W 76/14* (2018.02)

(56) References Cited

U.S. PATENT DOCUMENTS

| | | | |
|---|---|---|---|
| 11,159,935 B2 * | 10/2021 | Cheng | H04W 8/18 |
| 11,606,766 B2 * | 3/2023 | Li | H04W 56/0015 |
| 2014/0029471 A1 | 1/2014 | Tavildar et al. | |
| 2018/0035306 A1 * | 2/2018 | Zavesky | H04B 7/18506 |
| 2019/0222297 A1 * | 7/2019 | Vos | H04W 24/02 |
| 2019/0297462 A1 * | 9/2019 | Aljadeff | G01S 13/88 |
| 2019/0357033 A1 * | 11/2019 | Cheng | H04W 16/02 |
| 2020/0053683 A1 * | 2/2020 | Gulati | H04W 56/0045 |
| 2020/0322911 A1 * | 10/2020 | Li | H04W 72/02 |
| 2020/0344709 A1 * | 10/2020 | Khoryaev | H04B 7/2684 |
| 2021/0282032 A1 * | 9/2021 | Wen | H05B 47/19 |
| 2021/0360549 A1 * | 11/2021 | Lee | H04W 56/006 |
| 2021/0410091 A1 * | 12/2021 | Chae | H04W 72/30 |
| 2024/0073796 A1 * | 2/2024 | Azizi | H04W 52/0261 |

OTHER PUBLICATIONS

PCT Written Opinion of the International Searching Authority issued for International application No. PCT/EP2018/078881—Jul. 11, 2019.

* cited by examiner

METHOD AND ARRANGEMENTS FOR PROVIDING SATELLITE CONTROLLED DATA EXCHANGE

PRIORITY

This nonprovisional application is a U.S. National Stage Filing under 35 U.S.C. § 371 of International Patent Application Serial No. PCT/EP2018/078881 filed Oct. 22, 2018 and entitled "METHOD AND ARRANGEMENTS FOR PROVIDING SATELLITE CONTROLLED DATA EXCHANGE" which is hereby incorporated by reference in its entirety.

TECHNICAL FIELD

The present disclosure refers to an alternative way of exchanging data between two communication devices, and a communication device and a control centre adapted therefore.

BACKGROUND

The Unmanned Aerial Vehicle (UAV) or drone market is quickly expanding. UAVs are rapidly becoming an everyday presence, and it is predicted that they will play an important part in our future. The Federal Aviation Administration (FAA) projects the small model hobbyist UAV fleet to more than double from an estimated 1.1 million vehicles in 2017 to 2.4 million units by 2022. By 2025, the UAV market is expected to create an $82 billion economic impact and account for 100,000 jobs in the U.S. Technology only and market dynamics are creating a market for commercial UAV uses. UAVs are becoming cheaper, and advances in the fields of robotics, artificial intelligence, and mobile connectivity are fueling growth in the UAV industry.

The UAVs are already now used in a wide variety of applications throughout the society and new use cases are emerging. Examples of present use include e.g. delivery services, aerial photography and film making, remote sensing tasks for agriculture, city planning, civil engineering, support for public safety and rescue services. There are many different types of UAVs available on the market, that can be remotely controlled, using Wi-Fi or some proprietary radio technology. UAVs are capable of communication, sensing, as well as autonomous operation and are also able to analyze data collected e.g. via sensors and/or camera.

When no ordinary communication network is available or in situations when extended network coverage is required, UAVs can be used as relays between ground-based terminals and a network base station, or UAVs can serve as flying base stations, providing cellular network coverage to users, who otherwise would be out of network connectivity.

Delay-tolerant networking (DTN), or disruption-tolerant networking, is an approach to computer network architecture that seeks to address the technical issues in heterogeneous networks that may lack continuous network connectivity. Disruption may occur e.g. because of the limits of wireless radio range, sparsity of mobile nodes, energy resources, attack, and noise. DTN is an alternative to make broadband communication available in areas that e.g. lack coverage, e.g. by the use of UAVs.

DTNs are networks involving device-to-device (D2D) transfer of data (replicated data), typically in situations with no/or very limited network access. In such an approach, devices are capable of exchanging data when passing by, handing off data in a store and forward fashion for eventual delivery. Historically, DTNs can offer no types of guarantees or estimates in terms of delivery delays.

Devices participating in DTNs constantly scan for other devices to incorporate in the store and forward-scheme. Without any control layer, the only option is to be always-on in order to establish temporary connections with other devices in the network.

Even though UAVs are being incorporated in mobile networks as mobile base stations, such a solution may be costly in certain scenarios, such as e.g. when applied in areas with irregular demand for data exchange.

SUMMARY

It is an object of the present document to address, or at least alleviate, at least some of the problems described above.

According to one aspect, a method for executing a data communication between a first and a second communication device is suggested, where the method is executed in the first communication device. The suggested method comprise: listening to satellite transmissions, transmitting conditions for allowing the first communication device to exchange data with a second communication device; recognizing conditions for allowing exchange of data between the first and the second communication devices; determining requirements for data exchange under the mentioned conditions; determining, according to the conditions, a time interval within which the second communication device is expected to be located within D2D communication range of the first communication device, and executing data exchange between the first and the second communication device, via a D2D communication, within the determined time interval.

According to various embodiments, the first communication device may listen to the satellite transmissions according to instructions, which are accessible to the first communication device, or it can listen to the satellite transmissions at predetermined time intervals.

According to various embodiments, the conditions may consider various issues, such as e.g. one or more of: when and how to set up D2D communication for the data exchange between the first and the second communication device; when and how to execute the data exchange between the first and the second communication device, and when and how to determine that an initiated data exchange is to be considered as at least partly completed.

According to one embodiment, the method further comprise reception of a verification of successful reception of at least part of the data exchanged between the first and the second communication device. Such a verification may be received from at least one of: the second communication device; the satellite, and a third communication device.

According to one embodiment, the determining of a time interval is executed dependent on the location of the first communication device, wherein the time interval is selected when the second communication device is expected to be within D2D communication range of the first communication device.

According to another aspect, a computer program comprising instructions which, when executed on at least one processor, cause the at least one processor to carry out a method according to any of the embodiments described above, is suggested.

According to yet another embodiment, a computer program product comprising non transitory computer readable medium, having stored thereon a computer program, such as the one mentioned above, is also suggested.

According to another aspect, a method in a control center, capable of enabling data exchange between a first and a second communication device is suggested, the method comprising; acquiring information on locations where a first communication device, capable of exchanging data with a second communication device, is expected to be available for data exchange between the two communication devices; acquiring information on scheduled movements of the second communication device; initiating transmission of instructions to the second communication device, instructing it to adapt its scheduled movements to include movements within D2D, communication range of the mentioned location, and initiating satellite transmissions of conditions for allowing the first communication device to participate in a data exchange with the second communication device at the mentioned locations, via a D2D communication.

According to various embodiments, the acquiring of information on locations may be initiated based on one or both of an estimation of an expected demand for data exchange between the first and the second communication device, and at least one triggering of at least one condition associated with the mentioned locations.

According to various embodiments, the mentioned locations may be based on one or both of predetermined locations of the at least one first communication device, and predicted locations of the at least one first communication device.

According to various embodiments, the conditions may specify one or more of: a time interval, within which the second communication device is expected to be within D2D communication rage of the first communication device; when and how to set up D2D communication for the data exchange between the first and the second communication device; when and how to execute the data exchange between the first and the second communication device, and when and how to consider an initiated data exchange between the first and the second communication device to be considered as at least partly completed.

According to one embodiment, the suggested method comprise the further step of receiving a first verification, verifying one or both of that data has been successfully exchanged between the first and the second communication device, and that data, exchanged between the first and second communication device, has been at least partly successfully delivered from the second communication device to a communication network.

According to one embodiment, the method also comprise the further step of initiating transmission of a second verification, verifying, to the first communication device, that data exchanged between the first and the second communication devices, has been, at least partly, successfully received at a desired destination, i.e. no re-transmission will be needed for the successfully exchanged data.

According to one embodiment where no verification has been received by the control system, the control system is executing the further step of repeating the mentioned steps with the second communication device, or another communication device, capable of participating in a data exchange with the first communication device, via a D2D communication.

According to one aspect, a computer program, comprising instructions which, when executed on at least one processor, cause the at least one processor to carry out a method according to any of the embodiments described above, is suggested.

According to yet another aspect, a computer program product comprising non transitory computer readable medium, having stored thereon a computer program according to the mentioned computer program, is suggested.

According to another aspect, a first communication device, capable of participating in a data exchange with a second communication device, is suggested, where the first communication device is configured to: listen to satellite transmissions, transmitting conditions for allowing the first communication device to exchange data with a second communication device; recognize conditions for allowing exchange of data between the first and the second communication devices; determine requirements for data exchange under the mentioned conditions; determine, according to the conditions, a time interval within which the second communication device is expected to be located within D2D, communication range of the first communication device, and execute, within the determined time interval, data exchange between the first and the second communication device, via a D2D communication.

According to one embodiment, the first communication device may be configured to listen to the satellite transmissions according to instructions, accessible to the first communication device, or it may be configured to listen to the satellite transmissions at predetermined time intervals.

According to one embodiment, the first communication device may be configured to consider conditions, specifying at least one of: when and how to set up D2D communication for the data exchange between the first and the second communication device; when and how to execute the data exchange between the first and the second communication device, and when and how to determine that an initiated data exchange is to be considered as at least partly completed.

According to one embodiment, the first communication device is further configured to receive a verification of successful reception of at least part of the data exchanged between the first and the second communication device. The first communication device may be configured to receive a verification from at least one of: the second communication device; the satellite, and a third communication device.

According to one embodiment, the first communication device is further configured to determine a time interval dependent on the location of the first communication device, wherein the time interval is selected when the second communication device is expected to be within D2D communication range with the first communication device.

According to another aspect, a first communication device, capable of participating in data exchange with a second communication device is suggested, where, the first communication device, comprise processing circuitry and a memory, comprising executable instructions, which, when executed by the processing circuitry causes the first communication device to: listen to satellite transmissions, transmitting conditions for allowing the first communication device to exchange data with a second communication device; recognize conditions for allowing exchange of data between the first and the second communication device; determine requirements for data exchange under the mentioned conditions; determine, according to the conditions, a time interval within which the second communication device is expected to be located within D2D, communication range of the first communication device, and, execute, within the determined time interval, data exchange between the first and the second communication device, via a D2D communication.

According to another aspect, a first communication device, capable of data exchange with a second communication device D2D is suggested, where the first communication device, comprise: a listening module, configured to listen to satellite transmissions, transmitting conditions for allowing the first communication device to exchange data with a second communication device; a recognizing module, configured to recognize conditions for allowing exchange of data between the first and the second communication devices; a data exchange determining module, configured to determine requirements for data exchange under the mentioned condition; a time interval determining module, configured to determine, according to the conditions, a time interval within which the second communication device is expected to be located within D2D communication range of the first communication device, and a data exchange execution module, configured to execute, within the determined time interval, data exchange between the first and the second communication device, via a D2D communication.

According to another aspect, a control center, capable of enabling data exchange between a first and a second communication device, is suggested, where the control center is configured to: acquire information on locations where a first communication device, capable of exchanging data with a second communication device, is expected to be available for data exchange between said communication devices; acquire information on scheduled movements of the second communication device; initiate transmission of instructions to the second communication device, instructing it to adapt its scheduled movements to include movements within D2D communication range of said location, and initiate satellite transmissions of conditions for allowing the first communication device to exchange data device-to-device with the second communication device at said locations.

According to one embodiment, the control center is configured to initiate acquiring of information on locations based on one or more of an estimation of an expected demand for data exchange between the first and the second communication device, via a D2D communication, and at least one triggering of at least one condition associated with said locations.

According to one embodiment, the control center may be configured to consider locations which are based on one or both of predetermined locations of the at least one first communication device, and predicted locations of the at least one first communication device.

According to different embodiments, the control center is configured to consider conditions, specifying at least one of: a time interval, within which the second communication device is expected to be within D2D communication rage of the first communication device; when and how to set up D2D communication for the data exchange between the first and the second communication device; when and how to execute the data exchange between the first and the second communication device, and when and how to consider an initiated data exchange between the first and the second communication device to be considered as at least partly completed.

According to one embodiment, the control center may further be configured to receive a first verification, verifying one or both of: that data has been successfully exchanged between the first and the second communication device, and that data, exchanged between the first and second communication device, has been at least partly successfully delivered from the second communication device to a communication network.

According to one embodiment, the control center is further configured to initiate transmission (of a second verification, verifying, to the first communication device, that data exchanged between the first and the second communication devices, has been at least partly successfully executed.

For the situation when no verification has been received by the control system, the control center is, according to one embodiment, further configured to repeat the suggested procedure when interacting with the second communication device, or another communication device, capable of participating in D2D communication with the first communication device.

According to another aspect, a control center, capable of enabling data exchange between a first and a second communication device is suggested, where the control center comprise: a location acquiring module, configured to acquire information on locations where a first communication device, capable of exchanging data with a second communication device, is expected to be available for data exchange between said communication devices; a movement acquiring module, configured to acquire information on scheduled movements of the second communication device; a first instructing module, configured to initiate transmission of instructions to the second communication device, instructing it to adapt its scheduled movements to include movements within D2D communication range of said location, and a second instructing module, configured to initiate satellite transmissions of conditions for allowing the first communication device to exchange data with the second communication device at said locations, via a D2D communication.

BRIEF DESCRIPTION OF DRAWINGS

Embodiments will now be described in more detail in relation to the accompanying drawings, in which.

DETAILED DESCRIPTION

Figure 1:
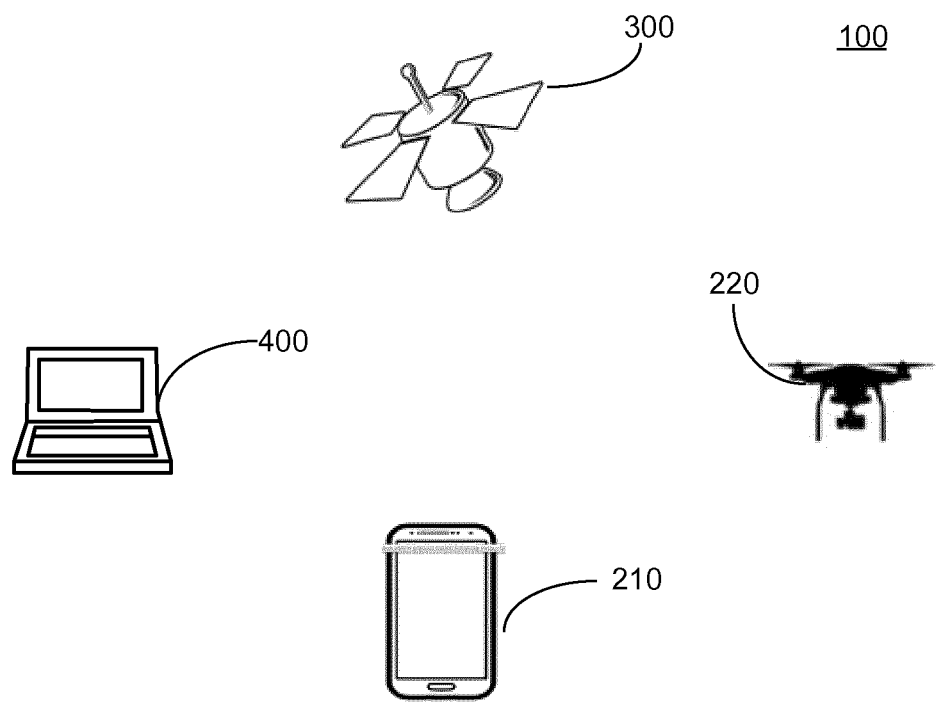
FIG. 1 is a simplified illustration of a network, capable of providing an alternative mechanism for data exchange between communication devices.

In order to, at least to some extent, remedy the problems mentioned above, a new technical concept is suggested where the route of a mobile communication device, such as e.g. a UAV, is scheduled so that a data exchange can be executed between the mobile communication device and another communication device, via a Device-to-Device (D2D) communication. By applying the suggested concept, a demand for data exchange between communication devices can be met in a geographical area with no or very limited network access, in a reliable way. The suggested solution is suitable e.g. for mobile phones that are temporary out of network connectivity, for IoT devices, which are placed in a remote location, without ordinary network connectivity, or for any type of communication device which is in need for alternative access possibilities when a demand for data exchange arises or reaches a peak.

By applying the suggested method, involved communication devices will be able to limit their active periods, needed for preparing for, and executing, data transmission. Thereby, the suggested method is advantageous both with respect to power savings as well as to costs for the required connections, compared to if data exchange would have been executed by applying alternative communication solutions.

Although any type of mobile communication device, capable of exchanging data via a D2D communication, can be used in the suggested concept, the examples given from hereinafter will be limited to UAVs, where the UAVs may be dedicated for the purpose of providing an alternative communication access, or where the UAVs are used for a primary purpose, such as e.g. for delivery of parcels, having also a secondary purpose of providing alternative communication access, whenever needed, and whenever it is considered that the first and the primary purposes can be combined with adequate efficiency and reliability. From herein after such a communication device will be referred to as a second communication device or a mobile communication device, whereas the communication device which is in need of an alternative data exchange concept, which may be any type of mobile of stationary communication device, will be referred to as a first communication device.

Briefly described, a satellite system is used for providing information, via broadcasting, on the scheduling of one or more UAVs, to communication devices, which are in need of exchanging, or transmitting, data. Use of a satellite system provides for a good coverage, also in geographical areas with no network infrastructure installed. Once a communication device, in need of exchanging data, has received the broadcasted scheduling information, it will be able to prepare for a wireless data exchange, via a D2D communication, based on when to expect the communication device to be within radio communication rage of the approaching UAV. The satellite system broadcasts information that is sufficient for the communication device to determine a suitable time or time interval, when data exchange can be executed between the two devices. The mentioned data exchange may comprise one-way transmission of data or exchange, from the communication device to the UAV, or a two-way exchange, where the communication device is transmitting data to the UAV, and the UAV is transmitting data to the communication device. In addition to providing information for determining a time or time limit for data exchange, further information, such as e.g. instructions for how to handle incomplete transmissions, or instructions on a maximum amount of data to transmit, may be provided as well.

FIG. 1 is illustrating components of a system 100, capable of providing alternative connectivity, as suggested herein. A communication device, here referred to as a first communication device 210, is capable of receiving information transmitted, via broadcasting, from a satellite system, here represented by satellite 300, which is connected to and, is capable of receiving instructions from a control center 400, controlling a route of a UAV, here referred to a second communication device 220, so that the route can be adapted to allow both communication devices 210,220 to come within radio communication range of each other, i.e. to allow D2D communication between the two communication devices 210,220 at least during a predetermined time interval.

The control center 400 is responsible for determining that, and how, the second communication device 220 need to adapt its route so that it will appear within radio communication range of the first communication device 210, and for instructing the satellite 300 to transmit information on such a route. Furthermore, the control center 400 is responsible for instructing the second communication device 220 of the adapted route.

Figure 2A:
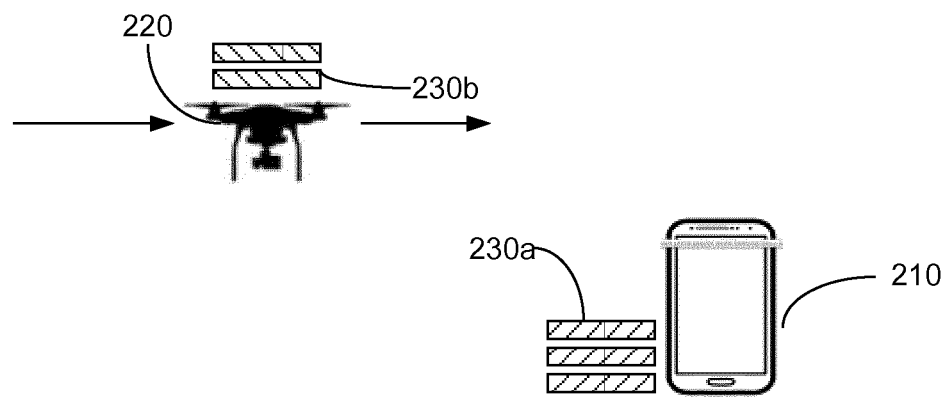
FIG. 2*a-c* is a series of illustrations, illustrating how data can be exchanged between two communication devices.
Figure 2B:
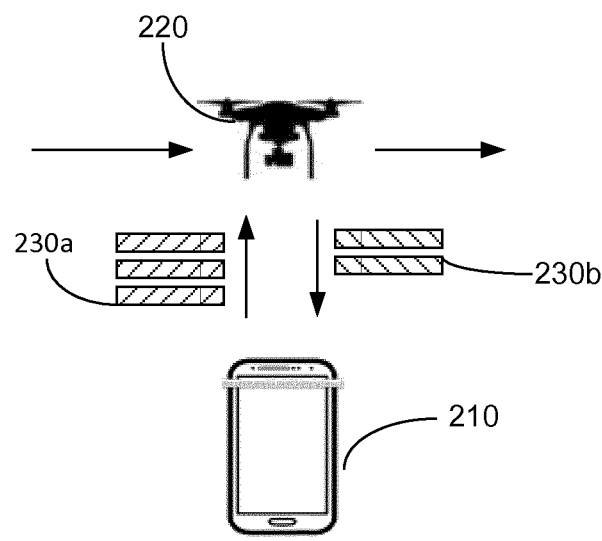
Figure 2C:
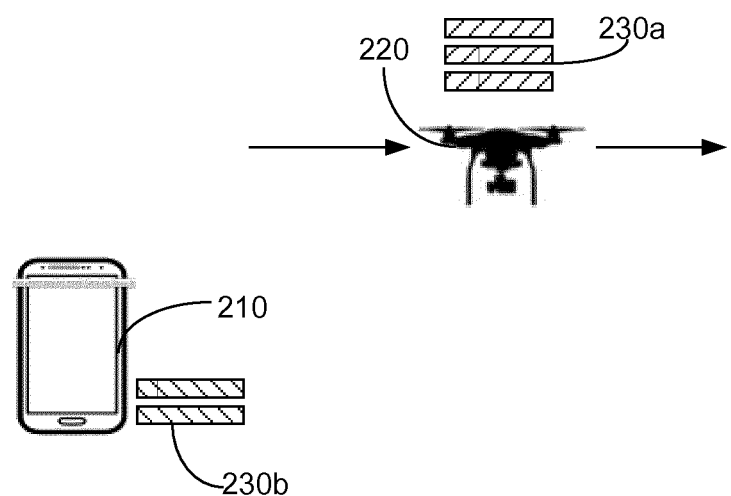

FIGS. 2a-2c are illustrating a typical data exchange scenario, where, as a prerequisite, a first communication device 210, in need of data exchange, has received instructions, indicating that a second communication device 220 is approaching the first communication device 210, offering an opportunity to exchange data, and where the second communication device 220, has received instructions to follow a route which is within radio communication range of the first communication device 210 during a predetermined time interval. In FIG. 2a, the first communication device 210 has data 230a, to be transmitted, stored, while the approaching second communication device 220 is carrying stored data 230b, destined to be transmitted to the first communication device 210. Although the given example is exemplifying a two-way exchange of data, it is to be understood that a data exchange may be limited to a one-way transmission if the demand only require such an exchange.

In a next FIG. 2b, the two communication devices 210, 220 are within radio communication range of each other at a time within a time limit, determined for a potential data exchange, and a two-way data exchange has been initiated. In the present example, data 230a is transmitted from the first communication device 210 to the second communication device 220, while data 230b is transmitted in the opposite direction.

FIG. 2c is illustrating a situation when the first communication device 210 has successfully received data 230b, and transmitted data 230a, while the second communication device 220, is continuing along its flying path, carrying the stored data 230a. In a typical scenario, data 230a may comprise e.g. sensor data, captured or aggregated by the first communication device 210, while data 230b may e.g. comprise software updates, to be used by the first communication device 210. Typically, the second communication device 220 will be forwarding the stored data 230a to a communication network, once it gains network access, or once it is docking to a docking station, providing network access, at a destination along its flying path.

Figure 3:
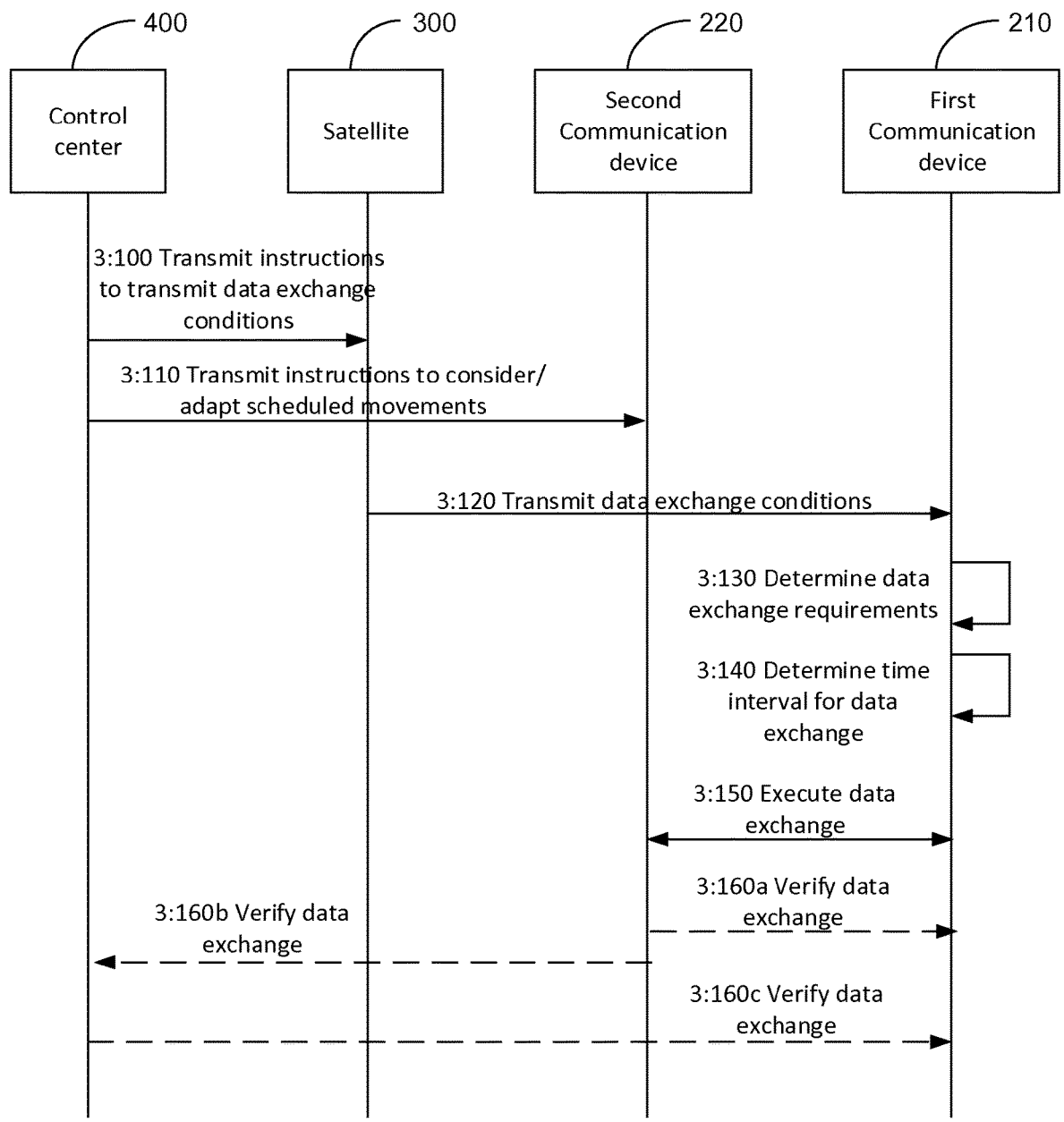
FIG. 3 is a signalling scheme, illustrating how entities involved in a data exchange can interact with each other, according to one embodiment.

FIG. 3 is a signalling scheme, illustrating how the entities of FIG. 1 can interact, according to one embodiment, when preparing for and executing a data exchange between two communication devices e.g. when no other communication access is available, or when an available communication access is considered to operate in an inadequate or unreliable manner. In a first step 3:100, a control center 400 is transmitting instructions to a satellite system, here represented by satellite 300, instructing it to transmit data exchange conditions, thereby allowing any communication device which may have a demand for data exchange, and which is capable of receiving such instructions, to become aware of such conditions, and, thus, of an alternative way of exchanging data with a mobile communication device over a limited time interval.

Transmission of the mentioned instructions may be triggered manually, e.g. due to a recognized demand to acquire data from, or to provide data to one or more communication devices, with which no regular communication access is available, or for which available communication access is not reliable enough. Alternatively, an automatic trigger may have initiated step 3:100. In the latter situation, the actual trigger may e.g. be absence of communication with a communication device, absence of updated data after a pre-determined timer has elapsed, or detection of an alarm. In order to be able to determine a need for, and how to schedule the route of the second communication device 220, the control center 400 may, alternatively, base its decision on predictions e.g. by predicting where and when there will most likely be communication devices that might have a need for data exchange, when communication access problems occur, or are expected to occur, in a communication network.

In another step 3:110, a communication device, allocated for the task of providing communication access to a first communication device 210, is receiving instructions on how to adapt to required scheduled movements. The transmission of the mentioned instructions is initiated by the control center 400, and may be sent to the second communication device 210 via a terrestrial communication network, if such a network is available. Alternatively, the instructions may be sent via the satellite system. Such instructions may comprise instructions to the second communication device 210 to prepare for data exchange, but without requiring to change an already planned flying route, but to stick to a determined route, which can be combined with passing a specific location where data exchange will be needed, or is expected to be needed, at a specific time interval. Alternatively, instructions may be configured to instruct the second communication device 220 to also re-arrange its planned flying route, by making a detour. The latter situation may e.g. be applicable when the second communication device 220 is destined to deliver a package, as a primary task, but is later re-routed, to, as a secondary task, also providing communication access to the first communication device 210. In addition to comprising the determined time interval, and if applicable, associated geographical locations indicating required re-routes, the instructions may also comprise further content, such as e.g. access credentials, to be used by the second communication device 220 during connection set-up, preparing for an upcoming data exchange. The second communication device 220 may receive the mentioned instructions before any route has been started, or, while being engaged in a started route, and while achieving a primary task, which has been decided to be combined with the new secondary task, by the control center 400.

In a further step 3:120, the satellite 300 responds to step 3:100, by transmitting appropriate data exchange conditions via broadcasting. Since satellite broadcasting provide for coverage of relatively vast geographical areas, such broadcasting can reach a large number of mobile and fixed communication devices, distributed over a vast area, in an efficient way. As indicated in FIG. 3, at least one communication device, here referred to as first communication device 210, listening to the broadcasted instructions, receives these instructions. The broadcasted instructions, applying to certain conditions, may be provided in a scheduling message which may e.g. be configured as follows: [ID, location, time, credentials], where "ID", is indicating the identity of the communication device, here the second communication device, whereas "location" indicates geographical coordinates where the second communication device is scheduled to be located at the time instance indicated by "time" in the message. Location and time may typically be given as start and stop locations, together with associated time intervals. "Credentials" are here relating to access credentials, allowing a first communication device 210 to set up a Device-to-Device (D2D) communication with the second communication device 220, identified by ID. The first communication device 210 may have been pre-configured how to handle the content of the suggested scheduling message, how to set-up a connection with the second communication device 220 and how to execute a data exchange, once it has received relevant instructions from the broadcasting. Alternatively, it may also have been pre-configured on how to proceed e.g. in case of failure to execute a successful data exchange, or in case only parts of data can be exchanged. According to yet another alternative, further instructions on how to handle certain scenarios, or alternative options may be provided as additional data in the broadcasted and received scheduling message, may be available as pre-configured instructions, or as a combination of broadcasted and pre-configured instructions.

In another step 3:130, the first communication device 210, determines that it has a demand for data exchange, and in response to such a determination, it determines, or selects, a time interval which is suitable for data exchange, based on the acquired instructions, including an available time limit, as indicated in step 3:140. In case different instructions, relevant for different communication devices, corresponding to the second communication device in the present example, have been broadcasted, there may be different time intervals to choose from at this step. In order to determine a suitable time interval, the first communication device 210 may need to determine its location, in order to be able to correlate its present location with scheduled locations of the second communication device. Such a location determination may be executed e.g. based on conventional GPS functionality, available to the first communication device 210. Alternatively, the first communication device 210 may be aware of its location, e.g. from stored data, especially, in a scenario where the first communication device 210 is a fixed communication device, such as e.g. a stationary Internet of Things (IoT) or Machine Type Communication (MTC) device.

According to another step 3:150, data is exchanged between the two communication devices 210,220, when the respective conditions are met. The actual data exchange is preceded by a connection set-up between the two communication devices 210,220, which may be initiated by either the first or the second communication device, depending on the circumstances. In case a second communication device 220 is approaching a first communication 210, located at a location known to the control center 400, the instructions, provided to the second communication device 220 in step 3:110 may comprise instructions to the second communication device 220 to initiate connection set-up, while the first communication device 210 may instead be the device initiating a connection set-up, in situations when the location of the first communication device 210 is unknown to the control center 400. The mentioned connection set-up, typically comprise a handshaking procedure, which may include verification of credentials. The connection set-up may also trigger the second communication device 220 to adapt its pace so as to slow or even circulate or hoover during the following data exchange. Typically, the data received by the second communication device 220 is stored by the device, with the intention to forward the stored data when gaining network access, but in case the second communication device 220 has network access at the time of data exchange, it may relay the received data to the network instantly, without requiring any intermediate data storage.

According to one embodiment, the suggested process may terminate once the available data has been exchanged, thereby assuming that the executed data exchange has been successfully completed. According to an alternative embodiment, each data reception is instead verified or acknowledged by the respective receiving entity to the respective transmitting entity, such that e.g. according to optional step 3:160a, the second communication device 220 verifies to the first communication device 210 that all or parts of the transmitted data has been successfully received.

As indicated in another optional step 3:160b, the second communication device 220 can also verify successful reception of data to the control center 400. If the second communication device 220 does not have network access when it has received exchanged data, a verification or acknowledgement of a successful reception of data can be postponed until network access is again available to the second communication device 220, or, possibly, until a pre-determined timer has elapsed, so that a maximum time limit for receiving a verification or acknowledgement is applied, before the first communication device 210 proceed to the next step, which may e.g. be to re-try to successfully complete a previously failed data exchange. In situations such as e.g. where the first communication device 210 is only temporary out of communication network access, a control center 400, to which the second communication device 220 has verified successful data exchange, can forward such a verification or acknowledgement also to the first communication device 210, whenever possible, as indicated with another optional step 3:160c. In the latter scenario, the control center 400, may use such a verification or acknowledgement as a basis for determining how to re-arrange the flying route of the second communication device 220 in the future.

The first communication device 210 typically maintain its connection with the second communication device 220, awaiting a verification or acknowledgement for a certain time, but in case of absence of a verification or acknowledgement, it may react in one of different ways. According to one embodiment, which may be applied e.g. by a first communication device 210, having very limited, or no storage capacity, the first communication device 210 will ignore the failed data exchange, and instead send new, updated data at an upcoming occasion. According to another embodiment, the first communication device 210 have stored the unsuccessfully exchanged data, and will make another attempt to exchange the stored data, possibly together with new, updated data, at an upcoming occasion. According to yet another embodiment, the first communication device 210 connects to the same or another second communication device 220 at an upcoming occasion, preparing for possible reception of a verification or acknowledgement of the previous data exchange.

It is to be understood that connection set-up, connection termination, as well as verification or acknowledgement of successful data exchange may be executed according to alternative approaches, as long as the respective procedure is executed according to broadcasted conditions, or according to a combination of broadcasted conditions and conditions pre-configured at the first communication device 210. It is also to be understood that the steps described above may be executed in a different order, as long as the requirements for data exchange are obtained accordingly. By way of example, determining step 3:130 may be executed prior to step 3:120, so that a determining of data exchange requirements at the first communication device 210 triggers the first communication device 210 to receive broadcasted conditions.

A method to be executed in or by a first communication device 210, capable of exchanging data in a satellite supported system, such as the one described herein, will now be described in further detail with reference to FIG. 4. It is to be understood that the first communication device 210 may have been pre-configured to execute the suggested method e.g. during manufacturing or installation, e.g. in case the first communication device 210 is an IoT device, or the method may be initiated by activating an Application (App), or a Web service, adapted therefore, e.g. in case the first communication device 210 is a smartphone, a laptop or any other type of suitable consumer product, capable of D2D communication.

In a first step S400, the first communication device 210 listens to satellite transmissions. When and how to listen to satellite transmissions may be specified in instructions, which are accessible to the first communication device 210. In a typical scenario, the first communication device 210 may leave a sleep-mode, or any other, type of low energy mode, at pre-determined time intervals, for listening to the mentioned type of satellite transmissions, or a suitable trigger may initiate the suggested listening activity.

In another step S410, the first communication device 210 recognizes broadcasted conditions for data exchange, i.e. it determines that it will be able to execute a data exchange, via a D2D communication, at a specific upcoming time interval, which fits with the location of the first communication device 210 within the mentioned time interval. The mentioned conditions may specify various types of conditions, such as e.g. one or more of: when and how to set up D2D communication for the data exchange between the first and the second communication device; when and how to execute the data exchange between the first and the second communication device, and when and how to determine that an initiated data exchange is to be considered as at least partly completed.

As indicated in another step S420, the first communication device 210, having determined that it has data to exchange, determines requirements for exchanging data under the relevant conditions. If there is no data to exchange, the suggested method is terminated. At this stage, the first communication device 210 may start to listen to new conditions, as indicated in step S400 more or less immediately, after a certain time interval has elapsed, or once a trigger has initiated such an action to be initiated again.

Figure 4:
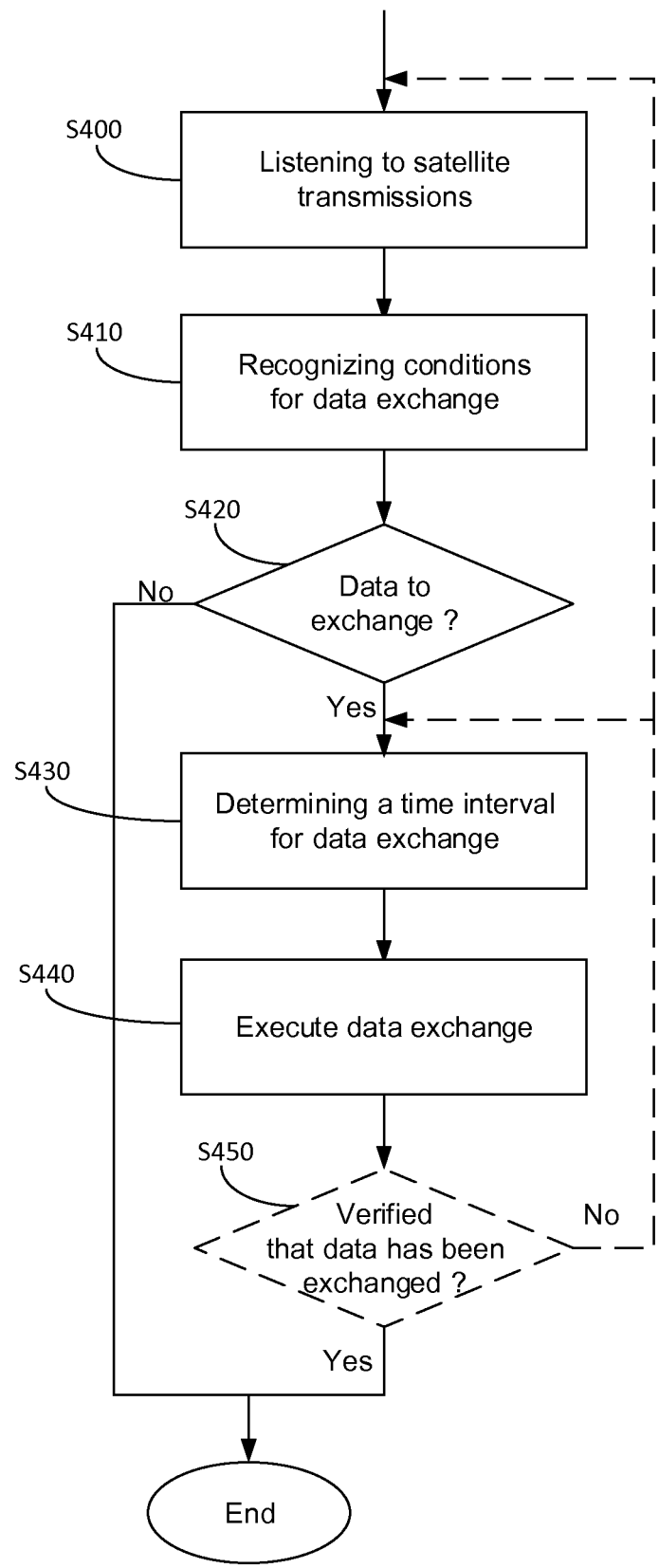
FIG. 4 is a block scheme, illustrating a method executable in a communication device which may be in need for an alternative approach for exchanging data.

However, in case there is data to exchange, as indicated in FIG. 4, the first communication device 210 will make use of the information acquired in step S410 for determining when in time, or within which time interval, to execute the required data exchange, as indicated with another, subsequent step S430. The determining of the time interval is typically dependent on the location of the first communication device 210, and, in such a situation, the time interval may be selected when the second communication device 220 is expected to be within D2D communication range of the first communication device 210.

Once the time for data exchange has been decided, the actual data exchange can be executed, when conditions permit. The data exchange is executed in steps S440 and may comprise any type of suitable connection set-up and termination, for terminating the connection set-up, when it has been determined that the data exchange has been successfully completed.

According to an optional step S450, each data transmission, comprised in an initiated data exchange, may comprise also a verification or acknowledgement of successful data exchange or transfer, whereas an un-successful data exchange may be handled according to broadcasted conditions, pre-defined conditions, or according to a combination of both. Such a verification may be received from any of the second communication device 220, verifying successful reception by that device, from the satellite, verifying successful reception by the second communication deice 220 and/or by a network node, to which the second communication node has provided exchanged data, or from another communication device, providing a further chance of exchanging data. As indicated in FIG. 4, a failed data exchange may result in repeating all steps of the described method, or determining of a new time interval for data exchange, depending on what information is available to the first communication device 210.

Again it is to be understood that the steps mentioned above, with reference to FIG. 4, may be executed in another order, such that e.g. step S420 is executed prior to step S400, constituting the trigger for starting to listening to the suggested satellite transmission.

Figure 5:
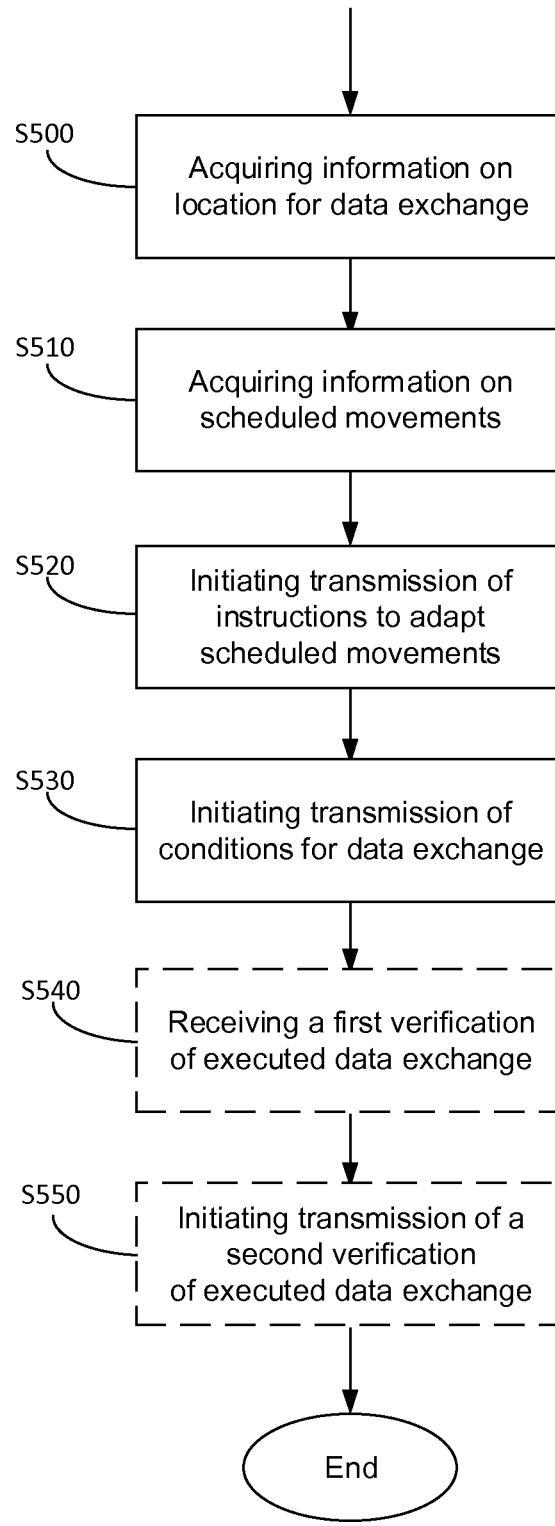
FIG. 5 is a block scheme, illustrating a method executable in a mobile communication device, offering an alternative approach for exchanging data.

A method to be executed in or by a control center 400, capable of providing for data exchange between a first and a second communication device 210,220, as described herein, will now be described in further detail with reference to FIG. 5. The control center 400 may be configured as a manually controlled system, as an automatic system or as a combination of both. In a first step S500, the control center 400 is acquiring information on locations where data exchange is, will be, or is estimated to be required, in the near future. According to one embodiment, a geographical area may e.g. have been subject for a natural disaster, which has resulted in disruptions or total failure of network connectivity. In such a situation the method described herein may be triggered automatically, or manually, by specifying the geographical area that will need to be supported by the suggested data exchange mechanism. According to another embodiment, communication devices that subscribe to a service, supporting the suggested data exchange mechanism, may be adapted to provide verifications of network connectivity at regular intervals, whereas the control center 400 may interpret absence of such verifications as a trigger for launching the mentioned data exchange mechanism in a specific geographical area, thereby providing an alternative option for data exchange in that area. According to yet another embodiment, locations of communication devices, such as e.g. IoT devices, arranged at remote locations, with no or limited network access, may be known to, and registered at the control center 400. In such a scenario, the control center 400 may be configured to launch the mentioned data exchange mechanism at the known locations at regular time intervals, so that data can be collected more or less regularly. Consequently, the information on locations, may be based on estimations, or on factual triggers. Furthermore locations may be already known to the control center 400, or the locations may be based on predictions.

In another step S510, the control center 400 acquires information on scheduled movements of one or more communication devices that is/are considered to be potential counterparts for a data exchange. Both flying and non-flying mobile communication devices may be considered, as long as the control center 400 has access to scheduled movements or routes of the respective communication device. Typically a second communication device 220 which will need to have its flight schedule changed at a minimum, or which is located closest to the geographical area identified in step S500 will be chosen by the control center 400.

In yet another step S520, the control center 400 initiates transmission of instructions to a selected second communication device 220 to adapt its scheduled movements so that it will be able to offer data exchange capabilities in the selected geographical area, or locations, i.e. so that the second communication device 220 will be adapted to move within D2D communication range of the mentioned selected geographical area. According to one embodiment, such instructions may be pre-configured such that the selected geographical area is sequentially covered according to a certain time table, i.e. during a certain time interval, the selected communication device is instructed to be available for potential data exchange in the given geographical area. According to another embodiment, the control center 400 is instead configured to adapt the instructions e.g. based on one or more of the terrain of the geographical area and the likeliness of approaching communication devices having data to exchange in various parts of the geographical area. Such adaptations may be done automatically, manually or as a combination of both.

Once step S520 has been completed, the control center 400 is configured to initiate satellite transmission of conditions for data exchange, as indicated with another step S530. At this stage, a satellite system is instructed to broadcast conditions for executing data exchange in the selected geographical area. As already mentioned above, such conditions may comprise more or less data, depending e.g. on level of security and on the level of pre-configuration of the communication devices, receiving and interpreting the mentioned conditions.

At this stage, the mentioned method may have been completed by the control center 400, unless the mentioned steps are to be repeated at regular time intervals, which may include selection of another mobile communication device for covering the selected geographical area, thereby being available for further data exchange. However, in case, the control center 400 is also adapted to consider whether a data exchange has been successful or not, it may also await reception of a verification or acknowledgement from a mobile communication device, verifying that it has successfully received exchanged data, as indicated with optional step S540. Alternatively, the mentioned verification, or another verification, may indicate that the exchanged data has been successfully transmitted to a communication network, or has even reached its final destination, such as e.g. a server, configured to process acquired sensor data. According to another optional step S550, the control center 400 may also initiate transmission of another verification or acknowledgement to the first communication device 210, verifying that exchange, and possibly also transmission of the exchanged data, has been successfully completed. In case verifications, are applied according to one or more of the embodiments mentioned above, the control center 400 may repeat the process described above, in case no expected verification is received, accordingly.

Figure 6:
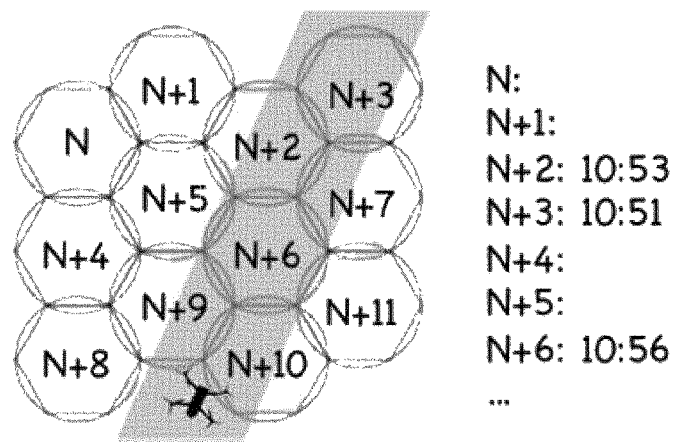
FIG. 6 is illustrating one example of how a mobile communication device can be scheduled for covering a geographical area, when offering an alternative approach for exchanging data.

FIG. 6 is an illustration, illustrating how a specific geographical area, presented in the figure as a shaded path, can be serviced by a second mobile communication device 220.

In FIG. 6 a communication network is covered by cells N–N+11, but in case of no network infrastructure, a geographical area may, alternatively be divided according to other principles, e.g. in case a geographical area does not have network coverage. A mobile communication device, providing an alternative way of exchanging data, as described herein, is set to move according to the list to the right of FIG. 6, where cell N+3 will be covered at time interval 10:51-10:53, cell N+2 at time interval 10:53-10:56 etc. If required, the mobile communication device may be scheduled to extend its flying path to also cover additional cells, or another mobile communication device may be scheduled to cover other geographical areas.

A communication device, herein referred to as a first communication device 210, capable of participating in D2D communication, as described herein, will now be described in further detail. The first communication device 210 is configured to listen to satellite transmissions, transmitting conditions for allowing the first communication device to exchange data with a second communication device 220. When listening to the mentioned transmissions, the first communication device 210, will be able to recognize conditions for allowing exchange of data between the first and the second communication devices 210,220. Thereby, the first communication device 210 will be aware of the prerequisites and possibilities of conducting a data exchange with a mobile communication device. The first communication device 210 is also configured to determine requirements for data exchange under the mentioned conditions, i.e. to determine e.g. whether or not it has data that need to be exchanged, and/or if it expects data to be delivered. Once the first communication device 210 has determined that there will be possibilities to exchange data, and that there is actually data that need to be exchanged, the first communication device 210 is configured to determine a time interval within which the second communication device 220 is expected to be located within D2D communication range of the first communication device 210. Such a determination will be based on the acquired conditions, thereby allowing the first communication device 210 to select the most suitable time interval. The first communication device 210 is then configured to execute data exchange between the first and the second communication device, via a D2D communication.

The first communication device 210 may be configured to listen to the satellite transmissions according to instructions, accessible to the first communication device, wherein such instructions may have been stored at a storage of the first communication device 210 e.g. at manufacture, at installation on site, or as a result of a data exchange, executed at a later stage. The first communication device 210 may be configured to execute the mentioned listening at predetermined time intervals, such as e.g. once a week, or once a month. Selection of such a time interval will provide for energy efficiency and predictability.

The first communication device 210 can be configured to consider a number of different conditions for an upcoming data exchange, which conditions may include e.g.: when and how to set up D2D communication for the data exchange between the first and the second communication device 210,220, including which device that will initiate the required call set-up; when and how to execute the actual data exchange between the first and the second communication device 210,220, and when and how to determine that an initiated data exchange is to be considered as at least partly completed. The latter conditions, may e.g. indicate when to expect a certain verification or acknowledgement to accept and how to interpret such a verification or acknowledgement of reception of a complete data exchange, or of a part of a data exchange. Such conditions may also specify how to proceed for enabling exchange of remaining, not yet exchanged data.

If verifications or acknowledgements of successful reception of exchanged data are applied, such verifications or acknowledgements may be received from the second communication device 220, verifying a successful D2D transmission. Alternatively, a verification or acknowledgement may be received from a satellite or a third communication device, e.g. in case the second communication device 220 is not within D2D communication range of the first communication device 210, but has managed to verify reception of data to a communication network.

The first communication device 210 may be capable of determining a time interval suitable for data exchange, without having to determine its location, e.g. in case the first communication device 210 is a fixed device, such as e.g. a fixed IoT device, with an already known location. However, in case the location of the first communication device 210 is not known, e.g. in case the first communication device 210 is a smart phone or mobile IoT device, which is temporary out of network connectivity, the first communication device 210 may be configured to apply any type of functionality, capable of determining the location of the device, such as GPS functionality, to determine its location, and to determine a suitable time interval, based on the acquired location information.

Figure 7:
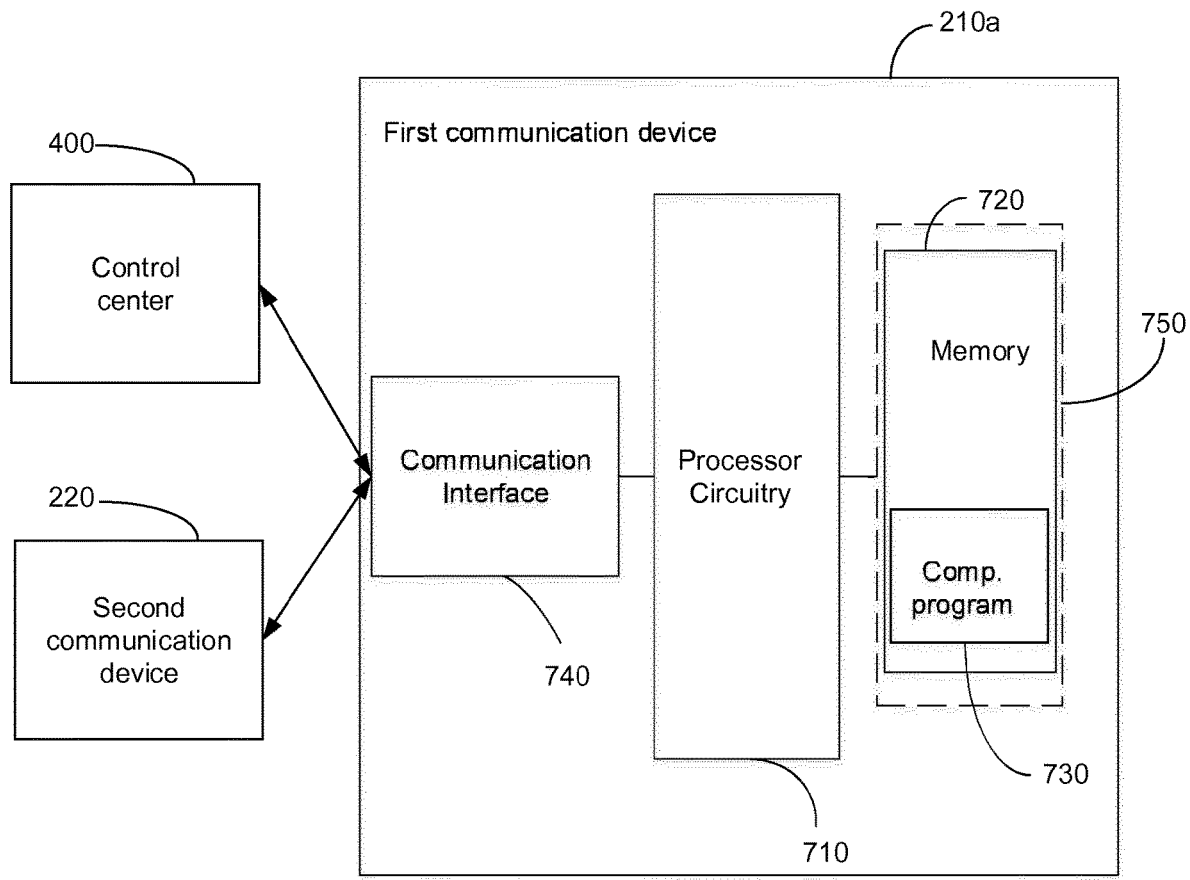
FIG. 7 is illustrating a block scheme of a communication device, according to a first embodiment, capable of preparing for and executing data exchange, using an alternative approach for data exchange.

According to one aspect, a communication device, capable of operating according to one or more of the embodiments described above may be configures as described in FIG. 7. According to FIG. 7, the communication device, herein referred to as s first communication device 210a, is capable of communicating with a mobile communication device, herein referred to as a second communication device 220, and a control center 400, via a communication interface 740, connected to processor circuitry 710, where the processing circuitry 710 is connected to a memory 720, comprising executable instructions or code, arranged as a computer program, which, when being executed by the processing circuitry 710, is configured to cause the first communication device 210 to operate according to one or more of the embodiments described above.

Figure 8:
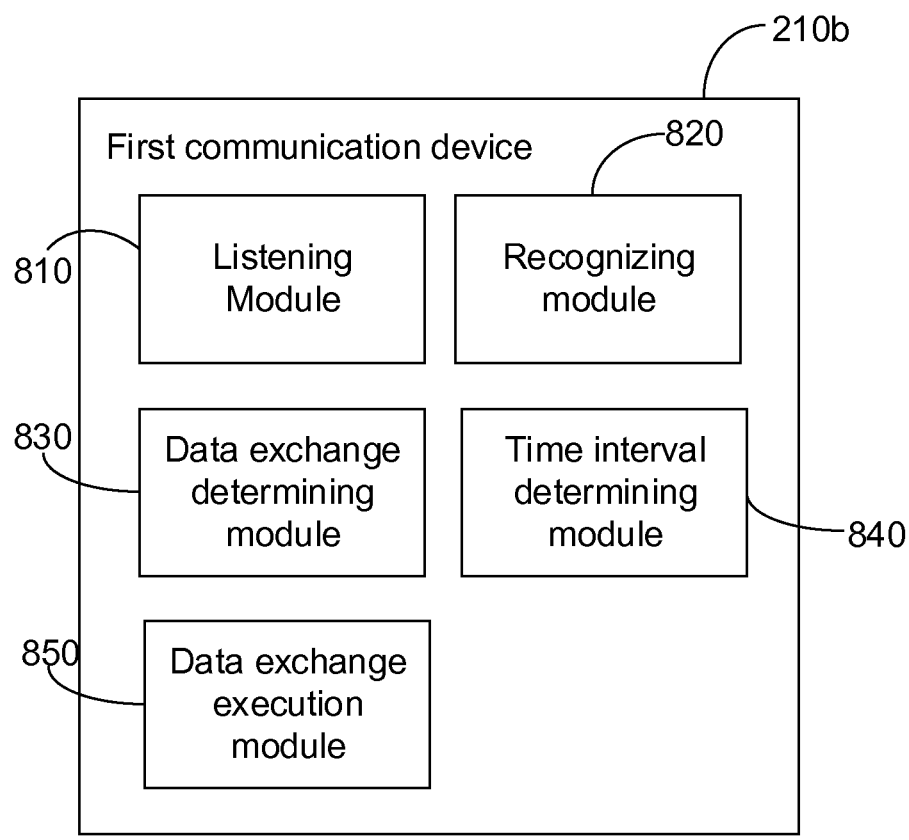
FIG. 8 is illustrating a block scheme of a communication device, according to a second embodiment, capable of preparing for and executing data exchange, using an alternative approach for data exchange.
Figure 9:
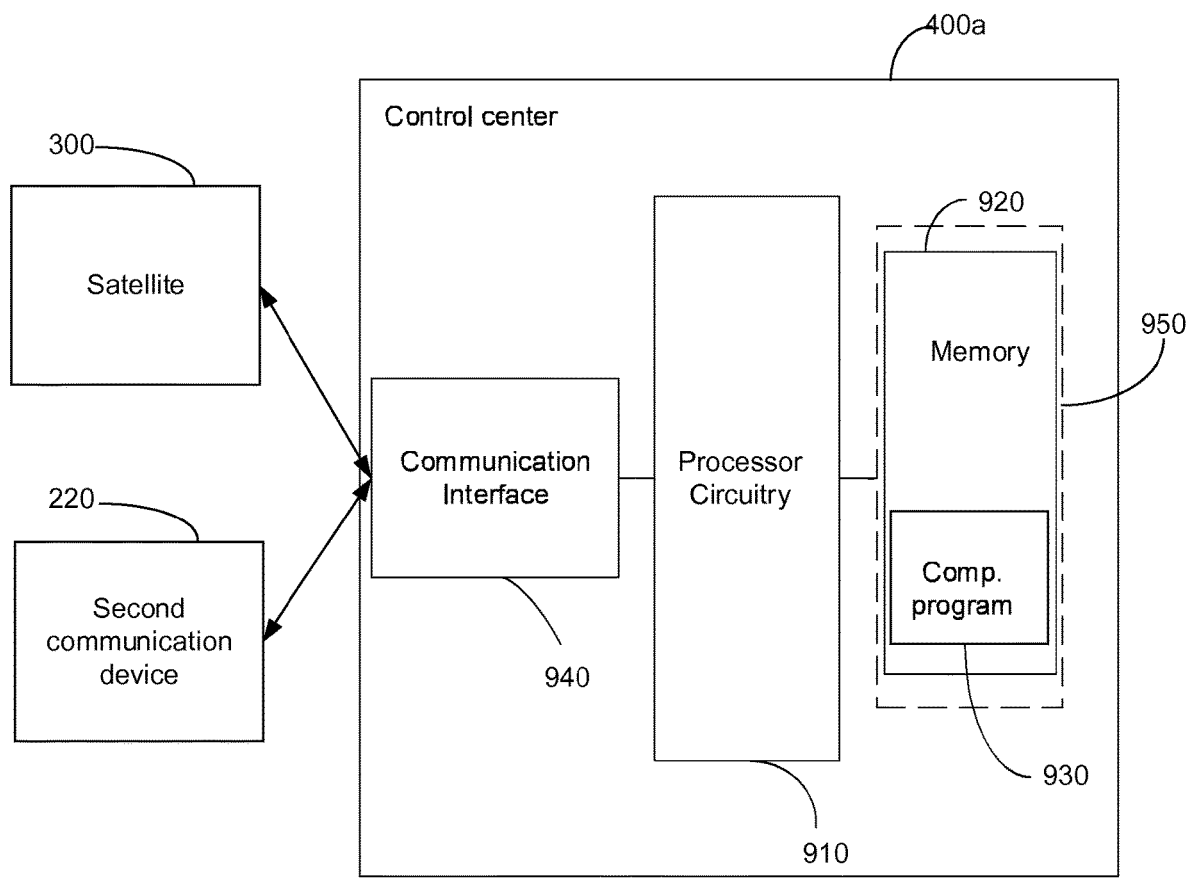
FIG. 9 is illustrating a block scheme of a control centre, according to a first embodiment, capable of managing an alternative approach for data exchange.
Figure 10:
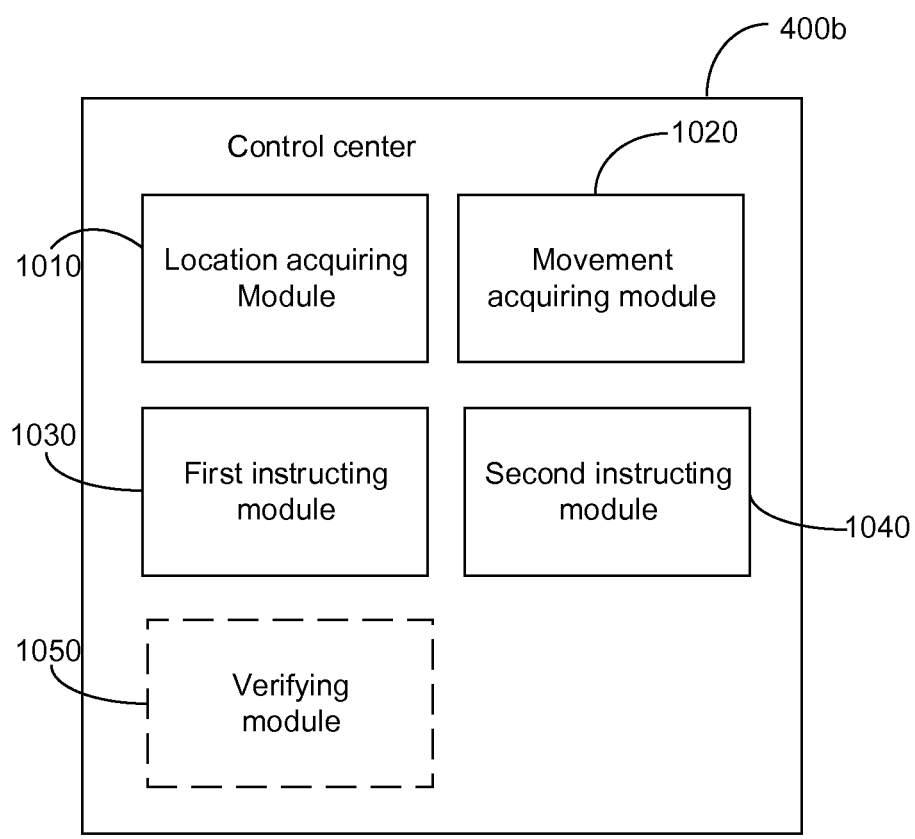
FIG. 10 is illustrating a block scheme of a control centre, according to a second embodiment, capable of managing an alternative approach for data exchange.

According to another aspect, a first communication device 210b, capable of operating according to one or more of the embodiments described above may be configures as described in FIG. 8. According to FIG. 8, the first communication device 210b comprise: a listening module 810, configured to listen to satellite transmissions, which is transmitting conditions for allowing the first communication device 610a to exchange data with a second communication device 220 (not shown); a recognizing module 820, configured to recognize conditions for allowing exchange of data between the first and the second communication devices 210a,220; a data exchange determining module 830, configured to determine requirements for data exchange under the mentioned conditions; a time interval determining module 840, configured to determine, according to the conditions, a time interval within which the second communication device 220 is expected to be located within D2D communication range of the first communication device 210a, and a data exchange execution module 850, configured to execute, within the determined time interval, data exchange between the first and the second communication device 210a,220, via a D2D communication.

A control center 400a,400b, capable of enabling data exchange between a first and a second communication device 210,220, will now be described in further detail, where the control center 400a,400b is configured to acquire information on locations where a first communication device 210, capable of exchanging data with a second communication device 220, is expected to be available for data exchange between the two communication devices 210,220. The control center 400a, 400b, may acquire such location based information in the form of a rough indication of a geographical zone, or more detailed coordinates of a specific geographical position, where the actual information may be provided e.g. from pre-stored data, or it may be acquired from a functionality, such as e.g. an alarm function, recognizing that a certain communication device has lost its network connectivity when located within a certain geographic area. The suggested expectation may be based e.g. on latest known location of a communication device, or an a prediction, executed by any type of known predicting functionality, comprised in, or accessible to the control center 400a,400b. The control center 400a,400b, is configured to acquire information on scheduled movements of the second communication device, where such information may e.g. reflect a pre-determined route for delivering a parcel, or for inspecting a certain geographical area or object. Once a second communication device 220 has been instructed to assist in the mentioned data exchange service, the control center 400a,400b is configured to also initiate satellite transmissions of conditions for allowing the first communication device 210 to exchange data with the second communication device at said locations, via a D2D connection.

The control center 400a,400b may be configured to initiate acquiring of information on locations based on different criteria, such as e.g. one or both of making an estimation of an expected demand for data exchange between the first and the second communication device, via a D2D communication, and recognizing at least one triggering of at least one condition, associated with the determined locations. The locations may be based on at least one of predetermined locations of the first communication device 210, and predicted locations of the first communication device 210.

The control center 400a,400b may be configured to consider various conditions, which may specify one or more of; a time interval, within which the second communication device is expected to be within D2D communication range of the first communication device; when and how to set up D2D communication for the data exchange between the first and the second communication device; when and how to execute the data exchange between the first and the second communication device, and when and how to consider an initiated data exchange between the first and the second communication device to be considered as at least partly completed. By combining various conditions in an efficient way, the control center 400a,400b will be capable of planning for efficiently executed data exchange missions, whenever required.

The control center 400a,400b may also be configured to receive a verification or acknowledgement, here referred to as a first verification, verifying e.g. that data has been, at least partly, successfully exchanged between the first and the second communication device 210,220, or that data, exchanged between the first and second communication device 210,220, has been, at least partly, successfully delivered from the second communication device 220 to a communication network. Reception of such a verification or acknowledgement may have an impact on how the control center 400a,400b is to continue with the mentioned data exchange procedure. In case a first verification, as suggested above, is applied, the control center 400a,400b may also be configured to initiate transmission of a second verification, verifying, to the first communication device, that data exchanged between the first and the second communication devices 210,220, has been at least partly successfully executed.

The control center 400a,400b may also be configured to repeat the procedure suggested above, either when interacting with the second communication device 210, or with another communication device, capable of participating in D2D communication with the first communication device 210.

According to another aspect control center 400b is suggested, which comprise: a location acquiring module 1010, configured to acquire information on locations where a first communication device, capable of exchanging data with a second communication device, is expected to be available for data exchange between said communication devices; a movement acquiring module 1020, configured to acquire information on scheduled movements of the second communication device; a first instructing module 1030, configured to initiate transmission of instructions to the second communication device, instructing it to adapt its scheduled movements to include movements within D2D communication range of said location, and, a second instructing module 1040, configured to initiate satellite transmissions of conditions for allowing the first communication device to exchange data with the second communication device at said locations, via a D2D communication.

The invention claimed is:

1. A method for executing a data communication between a first and a second communication device, the method, being executed in the first communication device comprising:

recognizing, from transmissions, transmitted from a satellite, conditions for allowing exchange of data between the first and the second communication devices;

determining requirements for data exchange under the mentioned conditions, when the first communication device does not have terrestrial network connection;

determining, according to the conditions, a time interval within which the second communication device is expected to be located within Device-to-Device, D2D, communication range of the first communication device, wherein the time interval is a time interval when neither the first, nor the second communication device has terrestrial network connection; and executing, within the determined time interval, data exchange between the first and the second communication device, via a D2D communication.

2. The method according to claim 1, wherein the first communication device is listening to the satellite transmissions according to instructions, accessible to the first communication device.

3. The method according to claim 1, wherein the first communication device is listening to the satellite transmissions at predetermined time intervals.

4. The method according to claim 1, wherein the conditions, specify at least one of:

when and how to set up D2D communication for the data exchange between the first and the second communication device;

when and how to execute the data exchange between the first and the second communication device, and when and how to determine that an initiated data exchange is to be considered as at least partly completed.

5. The method according to claim 1, further comprising:
receiving a verification of successful reception of at least part of the data exchanged between the first and the second communication device.

6. The method according to claim 5, wherein the verification is received from at least one of:
the second communication device;
the satellite, and
a third communication device.

7. The method according to claim 1, wherein the determining of a time interval is executed dependent on the location of the first communication device, wherein the time interval is selected when the second communication device is expected to be within D2D communication range of the first communication device.

8. A first communication device, capable of participating in a data exchange with a second communication device, the first communication device being configured to:
recognize, from transmissions, transmitted from a satellite, conditions for allowing exchange of data between the first and the second communication devices;
determine requirements for data exchange under the mentioned conditions, when the first communication device does not have terrestrial network connection;
determine, according to the conditions, a time interval within which the second communication device is expected to be located within Device-to-Device, D2D, communication range of the first communication device, wherein the time interval is a time interval when neither the first, nor the second communication device has terrestrial network connection; and
execute, within the determined time interval, data exchange between the first and the second communication device, via a D2D communication.

9. The first communication device, according to claim 8, wherein the first communication device is configured to listen to the satellite transmissions according to instructions, accessible to the first communication device.

10. The first communication device according to claim 8, wherein the first communication device is configured to listen to the satellite transmissions at predetermined time intervals.

11. The first communication device, according to claim 8, wherein the first communication device is configured to consider conditions, specifying at least one of:
when and how to set up D2D communication for the data exchange between the first and the second communication device;
when and how to execute the data exchange between the first and the second communication device, and
when and how to determine that an initiated data exchange is to be considered as at least partly completed.

12. The first communication device, according to claim 8, wherein the first communication device is further configured to receive a verification of successful reception of at least part of the data exchanged between the first and the second communication device.

13. The first communication device, according to claim 12, wherein the first communication device is further configured to receive a verification from at least one of:
the second communication device;
the satellite, and
a third communication device.

14. The first communication device, according to claim 8, wherein the first communication device is further configured to determine a time interval dependent on the location of the first communication device, wherein the time interval is selected when the second communication device is expected to be within D2D communication range with the first communication device.

* * * * *